(12) United States Patent
Te Vrugt et al.

(10) Patent No.: US 9,418,470 B2
(45) Date of Patent: Aug. 16, 2016

(54) METHOD AND SYSTEM FOR SELECTING THE VIEWING CONFIGURATION OF A RENDERED FIGURE

(75) Inventors: Juergen Te Vrugt, Aachen (DE); Richard Daniel Willmann, Siegburg (DE); Gerd Lanfermann, Aachen (DE); Stefan Winter, Aachen (DE); Privender Kaur Saini, Eindhoven (NL); Annick Timmermans, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 836 days.

(21) Appl. No.: 12/738,659

(22) PCT Filed: Oct. 21, 2008

(86) PCT No.: PCT/IB2008/054325
§ 371 (c)(1),
(2), (4) Date: Apr. 19, 2010

(87) PCT Pub. No.: WO2009/053901
PCT Pub. Date: Apr. 30, 2009

(65) Prior Publication Data
US 2010/0208945 A1    Aug. 19, 2010

(30) Foreign Application Priority Data
Oct. 26, 2007 (EP) .................................... 07119415

(51) Int. Cl.
*G06K 9/00* (2006.01)
*G06T 15/20* (2011.01)
(Continued)

(52) U.S. Cl.
CPC ............. *G06T 15/20* (2013.01); *A63B 24/0003* (2013.01); *A63B 24/0006* (2013.01);
(Continued)

(58) Field of Classification Search
USPC ......... 382/100, 107, 154, 203, 207, 209, 217, 382/218, 285; 345/418, 419, 441, 442, 653, 345/679; 348/578; 715/700, 704–707, 709
See application file for complete search history.

(56) References Cited

U.S. PATENT DOCUMENTS

| 4,828,257 A | * | 5/1989 | Dyer et al. ........................ 482/5 |
| 5,625,577 A | * | 4/1997 | Kunii et al. ...................... 703/2 |

(Continued)

FOREIGN PATENT DOCUMENTS

| JP | 2003136465 | 5/2003 |
| WO | 0109861 A2 | 2/2001 |
| WO | 03083822 A1 | 10/2003 |

OTHER PUBLICATIONS

Willman et al: "Home Stroke Rehabilitation for the Upper Limbs"; Proceedings of the 29th Annual International Conference of the IEEE EMBS, 2007, pp. 4015-4018.
(Continued)

*Primary Examiner* — Shervin Nakhjavan

(57) ABSTRACT

A method for determining a viewing configuration of a rendered figure of a rehab-patient or a sports trainee, aiming to deliver a suitable view on the rendered figure, the method comprising the steps of capturing motion data in the 3D space of one or more body parts of the rehab-patientor the sports trainee and providing them to a computer; and further the step of performing on the computer measurements of deviation of the captured motion data from a reference list of motion data and/or measurements of main motion direction; and based on the results of the above measurements, determining the viewing configuration.

6 Claims, 3 Drawing Sheets

(51) Int. Cl.
 A63B 24/00 (2006.01)
 G06T 7/20 (2006.01)
 G09B 19/00 (2006.01)
 A63B 69/00 (2006.01)
 A63B 71/06 (2006.01)

(52) U.S. Cl.
 CPC ............ G06T 7/20 (2013.01); G09B 19/0038 (2013.01); *A63B 69/00* (2013.01); *A63B 2024/0012* (2013.01); *A63B 2071/0636* (2013.01); *A63B 2071/0647* (2013.01); *A63B 2220/34* (2013.01); *A63B 2220/40* (2013.01); *A63B 2220/803* (2013.01); *A63B 2220/806* (2013.01); *A63B 2225/50* (2013.01); *G06T 2207/10016* (2013.01); *G06T 2207/30004* (2013.01)

(56) References Cited

U.S. PATENT DOCUMENTS

| | | | | |
|---|---|---|---|---|
| 6,005,548 | A * | 12/1999 | Latypov et al. | 345/156 |
| 6,160,901 | A * | 12/2000 | Kage | 382/107 |
| 6,320,582 | B1 | 11/2001 | Yamamoto et al. | |
| 6,335,977 | B1 | 1/2002 | Kage | |
| 6,734,834 | B1 * | 5/2004 | Baram | 345/8 |
| 7,117,136 | B1 * | 10/2006 | Rosedale | 703/7 |
| 7,239,718 | B2 | 7/2007 | Park et al. | |
| 7,869,646 | B2 * | 1/2011 | Park et al. | 382/154 |
| 2002/0072452 | A1 * | 6/2002 | Torkelson | 482/51 |
| 2002/0075264 | A1 | 6/2002 | Iizuka et al. | |
| 2002/0136448 | A1 * | 9/2002 | Bortolussi et al. | 382/164 |
| 2003/0054327 | A1 | 3/2003 | Evensen | |
| 2003/0228033 | A1 | 12/2003 | Daniel et al. | |
| 2005/0020409 | A1 * | 1/2005 | Hayamizu et al. | 482/51 |
| 2006/0276945 | A1 * | 12/2006 | Kong et al. | 701/45 |
| 2007/0016265 | A1 * | 1/2007 | Davoodi et al. | 607/48 |
| 2007/0027631 | A1 * | 2/2007 | Cabrera et al. | 702/19 |
| 2007/0132765 | A1 | 6/2007 | Lee et al. | |
| 2007/0135225 | A1 * | 6/2007 | Nieminen et al. | 473/212 |
| 2008/0018792 | A1 * | 1/2008 | Bhat et al. | 348/578 |
| 2008/0088719 | A1 * | 4/2008 | Jacob et al. | 348/241 |

OTHER PUBLICATIONS

Ruttkay et al: "Towards a Reactive Virtual Trainer"; Intelligent Virtual Agents Lecture Notes in Computer Science, vol. 4133, Jan. 2006, pp. 292-303.

* cited by examiner

METHOD AND SYSTEM FOR SELECTING THE VIEWING CONFIGURATION OF A RENDERED FIGURE

FIELD OF THE INVENTION

The present invention relates to a method and a system for determining a viewing configuration of a rendered figure, for example of a person of whom posture analysis or analysis of his movements is desired.

In particular, the present invention relates to a method for automatically selecting one of more suitable viewing configurations of rendered images made from a person following rehabilitation therapy, a so called rehab-patient, for giving visual feedback to a therapist or to the rehab-patient.

BACKGROUND OF THE INVENTION

Stroke is the most prominent cause of permanent disability in the industrialized countries. One of the most prominent disabilities stroke survivors suffer from is half sided paralysis of the upper limbs. Rehabilitation exercises are proven to be efficient in regaining motor control, provided the training is intense and the patient is guided in the therapy.

Technical solutions for unsupervised home stroke rehabilitation require the use of appropriate feedback mechanisms to ensure proper exercising.

Motor skill acquisition in healthy persons as well as stroke victims is facilitated by so called 'augmented' or 'external' feedback. This type of feedback is in contrast to internal feedback where the person moving uses its own senses such as vision or proprioception.

External feedback can for example be given verbally through a coach. Such external feedback is for example known from sports teaching situations, e.g. when a person is taught how to make a golf stroke, or from physiotherapists, e.g. in case of stroke victims learning to reach out for an object again.

Another popular method especially in motor skill acquisition in sport is video analysis, as for example described in US 2003/0054327, where the learner and/or a supervisor view the learner after having executed a prescribed motion.

As video analysis captures only a single movement plane, inertial sensor systems are becoming increasingly popular.

Inertial sensors capture linear acceleration, angular velocity, and magnetic fields and can be used for a 3-dimensional motion capture of all limbs they are attached to.

The motion data is displayed to the learner in form of a rendered, animated figure, a so-called avatar. A coach is providing cues to the learners to point their attention to mistakes in the motion execution when reviewing the avatar motion with them.

An unsupervised home-stroke rehabilitation equipped with inertial sensors is able to track the movements of a patient in the 3D space. The resulting data provides the basis to render an avatar that mimics the movements of the patient. Both, the patient and/or the therapist can watch the avatar to analyze the patient's movements. Since the sensor system provides 3D data, the system enables the reviewer to watch the movements from different angles by rotating the avatar on the screen.

A problem experienced with the existing external feedback systems is that the viewing configuration, i.e. the rotation, tilt, zoom, and eventual other parameters, is still to be determined by the patient or the therapist, or in case of a sports teaching situation, by the trainee or the coach.

Current research prototypes of home-stroke rehabilitation systems using inertial sensors show the recorded movements from a pre-selected angle. This viewpoint is pre-selected to allow for the 'best' evaluation of the recorded movement.

However, the 3-dimensional recorded data allows the viewer to view the movements from different angles. A known system allows the viewer to rotate the avatar or zoom into the figure while watching the recordings, as shown in FIGS. 1 and 2. However, in this known system, the viewer still needs to be aware about the best viewport or, in other systems, the viewer is restricted to certain, pre-defined viewing setups that can be selected on demand. Thus, the viewer has to select the optimal configuration for reviewing the recorded data.

Since patients usually lack the expertise and additionally are cognitively impaired, they are in general not able to select the optimal viewing configuration. The optimal viewing configuration assists the patients in analyzing their own movements and recognizing wrong movement patterns.

For the therapists, selecting the optimal viewing configuration might require repeated watching of the exercises. Thus, starting with a viewing setup targeting at the problematic elements of the movement would increase the efficiency in the therapist's review process.

This also shows the benefit of measuring 3D motion data compared to 2D recordings, as for example delivered by a video camera. The 3D data allows the viewer to 'walk around' the virtual representation of the patient and focus on the region of interest.

Existing systems allow the user only to manually choose the viewing direction in steps of 90 degrees.

The present invention describes a method for determining a viewing configuration of a rendered figure of a rehab-patient, aiming to deliver a suitable view on the rendered figure.

OBJECT OF THE INVENTION

It is an object of the present invention to provide a method for determining a viewing configuration of a rendered figure of a rehab-patient in an automatic manner.

It is also an object of the invention to provide a suitable system for performing such method.

SUMMARY OF THE INVENTION

The above object is obtained by providing a method for determining a viewing configuration of a rendered figure of a rehab-patient or a sports trainee, aiming to deliver a suitable view on the rendered figure, the method comprising the steps of capturing motion data in the 3D space of one or more body parts of the rehab-patient or the sports trainee and providing them to a computer; and further the step of performing on the computer measurements of deviation of the captured motion data from a reference list of motion data and/or measurements of main motion direction; and based on the results of the above measurements, determining the viewing configuration.

It is extremely advantageous for a rehab-patient or a sports trainee that the feedback is given as an automatically chosen viewing configuration, without any need for input from the patient.

Optionally, a region of interest is first selected based on the measurements, and based on the region of interest, and thereafter the viewing configuration is automatically selected.

BRIEF DESCRIPTION OF THE DRAWINGS

The invention will now be elucidated with reference to the drawings, that show a number of non-limiting embodiments, and in which.

DETAILED DESCRIPTION OF EXAMPLES

In one embodiment, the invention consists of a computer system with a screen attached to this system. In addition, 3 inertial sensors are connected wirelessly to the computer system. The three sensors are attached to the patient's upper and lower arm of the affected side and the torso. The sensors deliver orientations of these body segments in the 3D space, the data are stored on the computer system while the patient executes an exercise.

Based on that stored data, the viewer, i.e. either the patient or the therapist, reviews the data using a computer system equipped with a screen. The program on the computer system enables the viewer to review the recorded data by showing a rendered, animated figure, often called avatar, on the screen. The figure is presented in a 3D virtual environment. Thus, it can be viewed from different perspectives. To change this viewing configuration, e.g. a mouse or dedicated buttons next to the rendering space of the avatar might be used.

Figure 1:
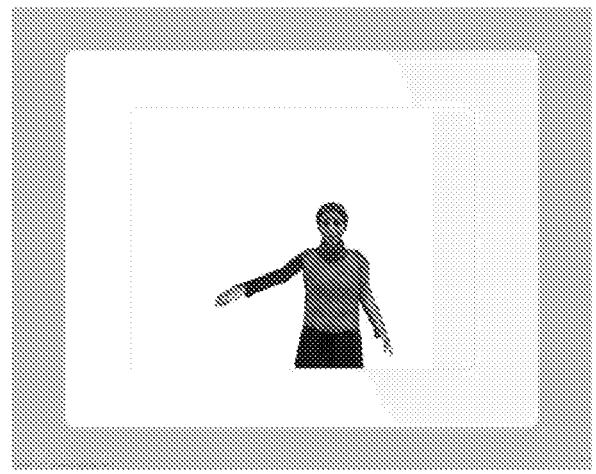
FIGS. 1 and 2 represent two viewing configurations of a rendered figure.
Figure 2:
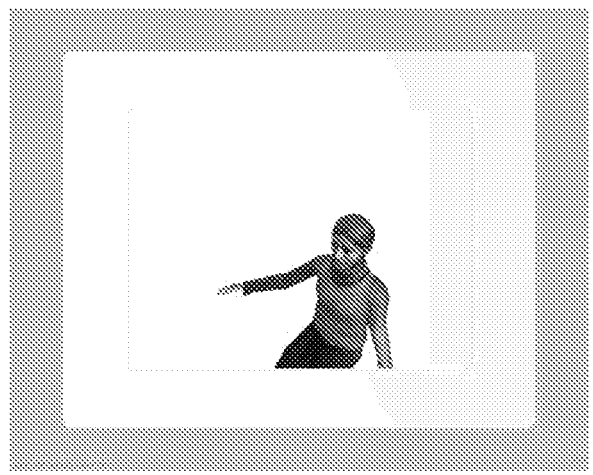
Figure 3:
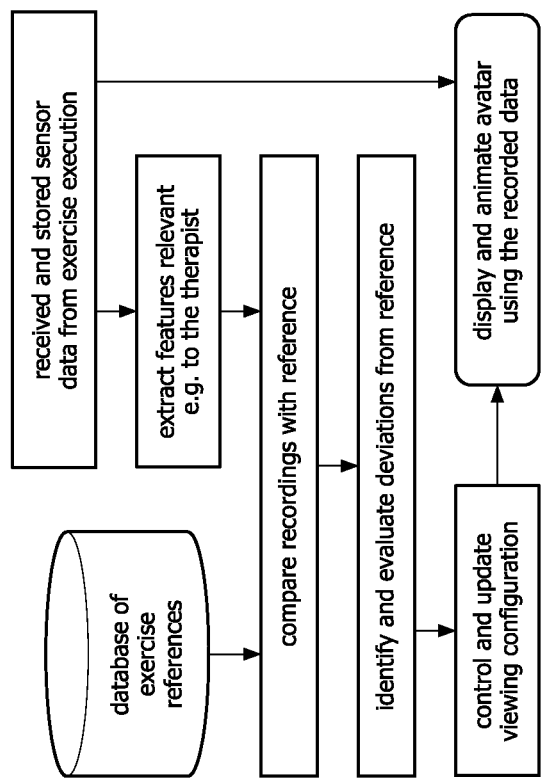
FIG. 3 represents schematically a preferred method according to the present invention.

The method depicted in FIG. 3 describes how to automatically adjust the viewing configuration during a review of 3D posture data. The viewing configuration to watch the avatar can be adjusted according to data recorded during the execution of an exercise: the data received from the sensors during exercise execution were stored. To review the exercise, the viewer selects the appropriate data, the system loads the data and starts processing it.

Next, motion parameters are derived from that data. Canonical motion parameters are angles in terms of the therapists' language, e.g. the shoulder flexion in the sagittal plane. The patient's data and some reference data, e.g. templates generated from a collection of previous recordings, are compared. The comparison includes the raw sensor data as received from the sensors and/or the motion parameters derived from the raw sensor data. The motion parameters of the reference data could either be computed on-line or be pre-computed and thus stored in the database of exercise references.

Among the various options to compare the reference data and the exercise recordings, one will be outlined next. Using dynamic time-warping, the reference data and recorded data are aligned with respect to time-scales. Then, the different motion parameters that have been identified as being relevant for comparison evaluated, i.e. in a time-window of a certain length (e.g. ½ second), for each motion parameter e.g. the Euclidian distance between the data points of reference and measurement or the distance of the mean values of these data points is computed.

Based on the comparison, the region of interest is identified. One possibility to obtain the region of interest is to identify the motion parameter where the comparison values indicate the largest deviation from the 'normal' given by the reference: at a certain point in time t, the motion parameter that contains the largest accumulated deviation in a certain time-window around t compared to the other motion parameters is selected.

Figure 4:
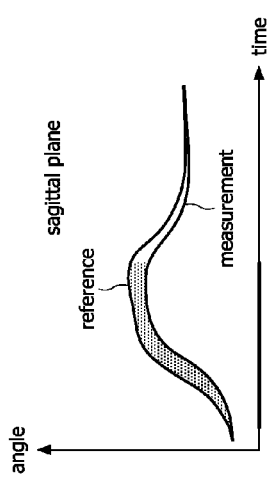
FIGS. 4 to 6 represent examples of motion parameters set out as a function of time.
Figure 5:
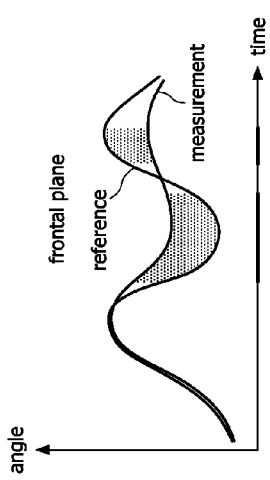
Figure 6:
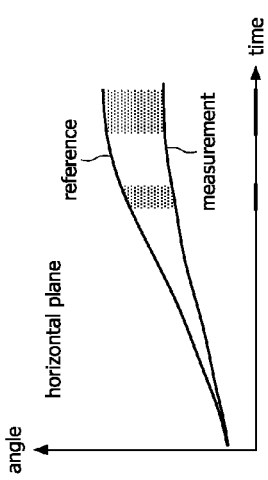

FIGS. 4 to 6 represent some curves of measured data and a reference of movements of a right shoulder. The horizontal axis represents the time axis, while in FIG. 4 the vertical axis represents the angle in the sagittal plane, in FIG. 5 the vertical axis represents the angle in the frontal plane and in FIG. 6 the vertical axis represents the angle in the horizontal plane. These planes are well known by therapists.

The most relevant motion parameter, in this case the flexion angle in a plane, changes over time, shifts in this example from the sagittal plane to the frontal plane, to the horizontal plane, to the frontal plane, and back to the horizontal plane.

Once the most relevant motion parameter for a certain time-span is known, the viewing configuration is adapted to enable to 'best' view on this motion parameter. i.e., that the rotation, tilt, zoom, etc of the virtual 3D space is adjusted to deliver the optimal view onto the area of interest.

The determination of the optimal viewing configuration given a certain selected motion parameter or selected motion parameter set could be done by using a pre-defined mapping table.

To provide such a mapping table, professionals in the field, especially therapists, can give an insight on the regions of interest given that the execution of an exercise deviates from a certain reference. From that, the table translating the identified motion parameters into the optimal viewing configuration can be provided.

In another embodiment, not represented though, instead of deviations from a certain reference, the main movement direction determines the viewing configuration. For example, if the patient mainly moves her arm to the side, the avatar is shown in a frontal view, since that transports the most parts of the movement information. The identification of the main movement directions can be done using the summation of velocity vectors and using the direction of the sum vector. Projections may be used as well.

For velocity or projection based finding of main direction, even no reference pattern is needed, which would make a reference database obsolete.

In a further embodiment, the reference patterns are actually averaged recordings of certain exercises by the patient, which would honor her handicaps, possibly supported by the therapist during a rehab session.

In a fourth embodiment, the identification of motion parameters is not limited to a single motion parameter but a collection of motion parameters. Thus, taking multiple motion parameters into account, if 4 motion parameters in total would be considered to be relevant, but the top candidate stands separate while the other 3 motion parameters are related, the 3 motion parameters might be selected as being the relevant ones.

In a fifth embodiment, the identification of the most relevant motion parameters is not limited to a small time-window but takes the context into account. For example, if mostly the sagittal plane is considered to be relevant and, within short fragments, the frontal plane is identified, the context could be used to stick to a viewing configuration that allows the optimal analysis of movements in the sagittal plane. This smoothes the display of the avatar and prevents too many changes in the view on the figure.

In a sixth embodiment, multiple avatars might be used to deliver an optimal view on the avatar. Due to the identified motion parameters, two or more avatars re-playing the patient's movements and being shown from different perspectives provide more insight on the region of interest than a single avatar. The optimal number of avatars may depend on the identified motion parameters.

The invention claimed is:

1. A method for determining a viewing configuration of a rendered figure of a human body, for generating a suitable view on the rendered figure, the method comprising the steps of:

capturing motion data in a 3D space of one or more body parts and providing the data to a computer;

rendering a figure that mimics the movement of the human body taking measurements of deviation of the captured motion data from at least one of a reference list of motion data and measurements of main motion direction; and based on the results of the measurements, determining the viewing configuration of the rendered figure the viewing configuration comprising at least one of: rotation, tilt, and zoom of the rendered figure wherein an area of interest is selected based on the measurements, the selected area of interest directly determining the viewing configuration on the basis of a mapping table defining a relation between any area of interest and parameters of the viewing configuration.

2. A method according to claim 1, wherein the method is performed within time frames and wherein the determination of the viewing configuration within a certain time frame takes the said measurements during previous and further time frames into account, for the purpose of providing stable or complementary viewing configurations.

3. A method according to claim 1, wherein the measurement of the deviation of the captured motion data from a reference list of motion data, comprises the steps of providing reference values by capturing the same motion data from an ideally performed exercise or by calculating a mean value of previously captured motion data; and calculating a measurement of distance between the reference values and captured values.

4. A method according to claim 1, wherein the main motion direction is determined using a summation of velocity vectors from the captured motion data and using the direction of the sum vector.

5. A method according to claim 1, wherein the main motion direction determined using projections of velocity vectors.

6. A method according to claim 1, wherein more than one viewing configuration is represented simultaneously.

* * * * *